(12) United States Patent
Hoering et al.

(10) Patent No.: US 8,125,709 B2
(45) Date of Patent: Feb. 28, 2012

(54) ILLUMINATION DEVICE, IN PARTICULAR FOR MICROSCOPES

(75) Inventors: Lutz Hoering, Oberkochen (DE); Andreas Nolte, Rosdorf (DE); Michael Brehm, Sulzbach-Laufen (DE); Mario Sondermann, Altenberga (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 217 days.

(21) Appl. No.: 11/887,462

(22) PCT Filed: Jun. 22, 2006

(86) PCT No.: PCT/EP2006/006001
§ 371 (c)(1),
(2), (4) Date: Sep. 27, 2007

(87) PCT Pub. No.: WO2006/136406
PCT Pub. Date: Dec. 28, 2006

(65) Prior Publication Data
US 2009/0224694 A1   Sep. 10, 2009

(30) Foreign Application Priority Data
Jun. 23, 2005   (DE) .......................... 10 2005 029 119

(51) Int. Cl.
*G02B 21/06*   (2006.01)

(52) U.S. Cl. ........................................ 359/385; 359/368

(58) Field of Classification Search .................. 359/368, 359/385, 390; 362/33, 227, 249.02, 249.01, 362/257, 296.01, 311.01, 311.04, 551, 552, 362/553, 554, 555, 556
See application file for complete search history.

(56) References Cited

U.S. PATENT DOCUMENTS 4,211,586 A    7/1980   Fang et al.
(Continued)

FOREIGN PATENT DOCUMENTS

DE            199 19 096           11/2000
(Continued)

*Primary Examiner* — Thuy Vinh Tran
(74) *Attorney, Agent, or Firm* — Frommer Lawrence & Haug LLP

(57) ABSTRACT

The present invention is directed to a controllable microscope illumination within a microscope system by which all essential contrasting methods in microscopy can be realized. The illumination device according to the invention comprises a plurality of individual light sources which can be regulated with respect to brightness, wherein these individual light sources are formed as unit cells and form a luminous surface by a periodic arrangement. In an advantageous arrangement, imaging optics are associated with each individual light source in order to magnify the image of the source surface of the individual light source so that the images of the source surfaces of adjacent individual light sources touch. Illumination variants for all of the essential contrasting methods in microscopy can be generated by way of the proposed solution. The proposed LED illumination is electronically switchable, can be regulated with respect to brightness, supplies all colors, is long-lasting and economical. LEDs have a long life and are very robust and insensitive to vibrations. The spatial light distribution and the color temperature are adjustable.

8 Claims, 3 Drawing Sheets

U.S. PATENT DOCUMENTS

| | | | |
|---|---|---|---|
| 4,826,269 A * | 5/1989 | Streifer et al. | 359/19 |
| 4,852,985 A | 8/1989 | Fujihara et al. | |
| 4,893,223 A * | 1/1990 | Arnold | 362/11 |
| 5,168,351 A * | 12/1992 | Bradley et al. | 348/780 |
| 5,309,277 A | 5/1994 | Deck | |
| 5,489,771 A | 2/1996 | Beach et al. | |
| 5,880,893 A * | 3/1999 | Suganuma | 359/717 |
| 6,369,939 B1 | 4/2002 | Weiss et al. | |
| 6,857,762 B2 * | 2/2005 | Shimokawa et al. | 362/245 |
| 6,985,288 B2 * | 1/2006 | Miyashita et al. | 359/385 |
| 7,204,949 B2 * | 4/2007 | Watanabe et al. | 264/271.1 |
| 2004/0263960 A1 | 12/2004 | Obuchi | |

FOREIGN PATENT DOCUMENTS

| | | |
|---|---|---|
| DE | 103 39 619 | 3/2005 |
| EP | 1 150 154 | 12/2001 |
| EP | 1 202 244 | 5/2002 |
| EP | 1 403 695 | 3/2004 |
| WO | 03/102555 | 12/2003 |
| WO | 2004/086117 | 10/2004 |

\* cited by examiner

US 8,125,709 B2

ILLUMINATION DEVICE, IN PARTICULAR FOR MICROSCOPES

CROSS-REFERENCE TO RELATED APPLICATIONS

This application claims priority of International Application No. PCT/EP2006/006001, filed Jun. 22, 2006 and German Application No. 10 2005 029 119.8, filed Jun. 23, 2005, the complete disclosures of which are hereby incorporated by reference.

BACKGROUND OF THE INVENTION a) Field of the Invention

The present invention is directed to a controllable microscope illumination within a microscope system by which all essential contrasting methods in microscopy can be realized.

b) Description of the Related Art

High-pressure lamps and halogen lamps are conventionally used in the prior art as microscope illumination. Because of deficient controllability with respect to brightness, color temperature and/or color, additional optical components such as filters, attenuators, and so on, are needed for controlling the output signal of the light source. Another essential feature is the given geometry of the light sources that are used which usually requires additional optics for shaping the light bundle. While all contrasting methods in microscopy can be realized by means of these light sources, the resources required for this purpose are usually considerable.

An illumination device for flexible configuration of standard illumination modes is described in U.S. Pat. No. 4,852, 985 A. Semiconductor light sources such as, e.g., LEDs arranged in two dimensions are used as an illumination source. The different illumination modes are implemented by selectively switching on the required LEDs. In addition, a device can be provided for adjusting brightness. By selectively switching on a quantity of LEDs in this way, the different types of illumination in a microscope can be realized without additional optical components. The surface light source can also be formed by the two-dimensional arrangement of LEDs emitting different colors, e.g., red, green and blue (RGB). In order to generate the most uniform possible color impression in the object plane without color fringes, the arrangement of the individual colors on the array is of great importance. U.S. Pat. No. 4,852,985 A describes a variant for a defined arrangement of LEDs for a three-color array. In this solution, a ground glass disk arranged in front of the surface light source is required to prevent nonuniformities in the illumination. The disadvantage in the LED-based RGB illumination for microscopy according to the prior art consists in that the spectral distribution does not cover the entire visual area which is necessary for the color-correct representation of microscopic samples.

U.S. Pat. No. 6,369,939 B1 likewise describes an illumination device for a microscope which uses LEDs. Two light sources are arranged in the illumination beam path to achieve an optimized geometric light flux. The second light source is located in a central bore hole of the collector lens. The light of the first light source is focused in the object plane via diffusing screens and collector lenses. This type of illumination is used for objectives having a small field and a large aperture. In contrast, the second light source illuminates the object plane with a parallel beam bundle based on Köhler's principle. This type of illumination is used for objectives having a large field and a small aperture. Depending on the objective that is used, one light source or the other is used for illuminating the object plane. This solution has the drawback that the second light source is limited in size and therefore in intensity.

A transmitted light illumination unit for microscopes in which a transparent microscope stage is illuminated from below is described in DE 199 19 096 A1. The illumination unit which comprises one or more LEDs is constructed in such a way that it can be arranged in the aperture diaphragm plane and in front of Köhler illumination optics. To ensure an illumination which is as uniform as possible, suitable diffusing means are arranged in front of the LEDs.

EP 1 150 154 B1 describes an incident illumination for microscopes in which a ring carrier which is oriented around the optical axis is provided for receiving illumination means. In this case, light-emitting semiconductor diodes (LEDs) which are arranged in a plurality of concentric circles in the ring carrier are used as illumination means. The principal beam direction of the LEDs is directed to the optical axis. The longitudinal axes of the LEDs of a circle intersect at a point on or in the vicinity of the optical axis (system axis). The LEDs which are preferably constructed as white light diodes are controllable in groups and their brightness can be regulated. Dynamic illumination variants can also be realized with the described incident illumination.

Another incident illumination device is described in DE 103 39 619 A1. The incident illumination device is integrated in a surgical stereo microscope, the light generated by at least one LED being imaged in the object field coaxial to the microscope beam path via the main objective or additional illumination optics. Variants based on the Köhler principle as well as those based on non-Köhler principles can be implemented. White light LEDs or combinations of different colored LEDs, e.g., combinations of red, green and blue, can be used.

Also, WO 2004/086 117 A1 describes an arrangement for the illumination of objects with light of different wavelengths using LED light sources. A rotatable receiving device is provided with holders, each of which receives at least one LED. By rotating the receiving device, different LEDs are positioned in front of a light outlet opening. Also, white-light LEDs or combinations of different colored LEDs such as, e.g., combinations of red, green and blue can be used.

U.S. Pat. No. 5,489,771 A describes an LED light standard for photo- and videomicroscopy. In this calibration system, the intensity of a compact LED light source is controlled by means of a detector. A diffuser arranged in front of the LED light source ensures extensively homogeneous light and also ensures that a portion of the light radiation strikes the laterally arranged detector and can be evaluated. In this standard light source which is usable for calibration, the generated light intensities can be adjusted very exactly in that the energy supplied to the LEDs can be compensated continuously via the regulating circuit with the detector. The compact LED light source preferably comprises LEDs which emit different colors (RGG or RGB) and which can be controlled individually. A monochrome light can be generated by selectively controlling the LEDs and through the use of bandpass filters. It is necessary to synchronize the camera and/or video camera in a corresponding manner when generating pulse-modulated light.

OBJECT AND SUMMARY OF THE INVENTION

It is the primary object of the present invention to provide an illumination device which is electronically switchable, can be regulated with respect to brightness, emits different colors selectively or emits the color white additively with all of the components of white light and which is homogeneous over the illuminated field. The intensity is high enough so that all essential contrasting methods in microscopy are possible with the illumination device.

This object is met according to the invention in an illumination device for microscopes which comprises a plurality of individual light sources which can be regulated with respect to brightness. The individual light sources are formed as unit cells which fill a luminous surface by a periodic arrangement.

The illumination device according to the invention, in particular for microscopes, comprises a plurality of light-emitting semiconductor diodes (LEDs) which can be controlled individually and regulated with respect to brightness and illumination optics which are arranged in the illumination beam path of the microscope in or in the vicinity of the aperture diaphragm plane. The light cones of the LEDs that are used have small aperture angles and are formed as individual cells which fill up the entire surface of a carrier surface homogeneously.

Illumination variants for all of the essential contrasting methods in microscopy can be generated by means of the proposed solution.

The invention will be described in the following with reference to embodiment examples.

DESCRIPTION OF THE PREFERRED EMBODIMENTS

The illumination device according to the invention, particularly for microscopes, comprises a plurality of individual light sources which can be regulated with respect to brightness. These individual light sources are formed as unit cells and form a luminous surface by means of a periodic arrangement.

The luminous surface formed by the individual light sources can be planar, can have a conical section shape or a convex or concave shape. The carrier surface receiving the individual light sources is preferably reflecting.

The unit cell defines the smallest, at least 2-dimensional arrangement of light sources from which an at least two-dimensional surface can be filled by means of a periodic arrangement. The unit cells comprise a compact arrangement of more than three, preferably four to six, individual light sources with at least two different colors. In specific cases, individual light sources of the same color can also be used. In order to prevent color inhomogeneities in the object plane when using multi-color unit cells, the unit cells must be arranged as compactly and as close together as possible on the surface. The aim is for the color impression to always remain the same even as the magnification increases, i.e., as the observed object field decreases in size, and for the luminous density to be sufficient also for high magnifications.

While the unit cell in a first constructional variant comprises a compact arrangement of four to six individual light sources emitting different colors in which only one of each individual light source is provided, a second constructional variant provides unit cells of a compact arrangement of four to six individual light sources which emit different colors and in which two of each individual light source are provided. The larger unit cell essentially comprises two "small" unit cells, one of which has a mirrored arrangement of the individual light sources.

Figure 1A:
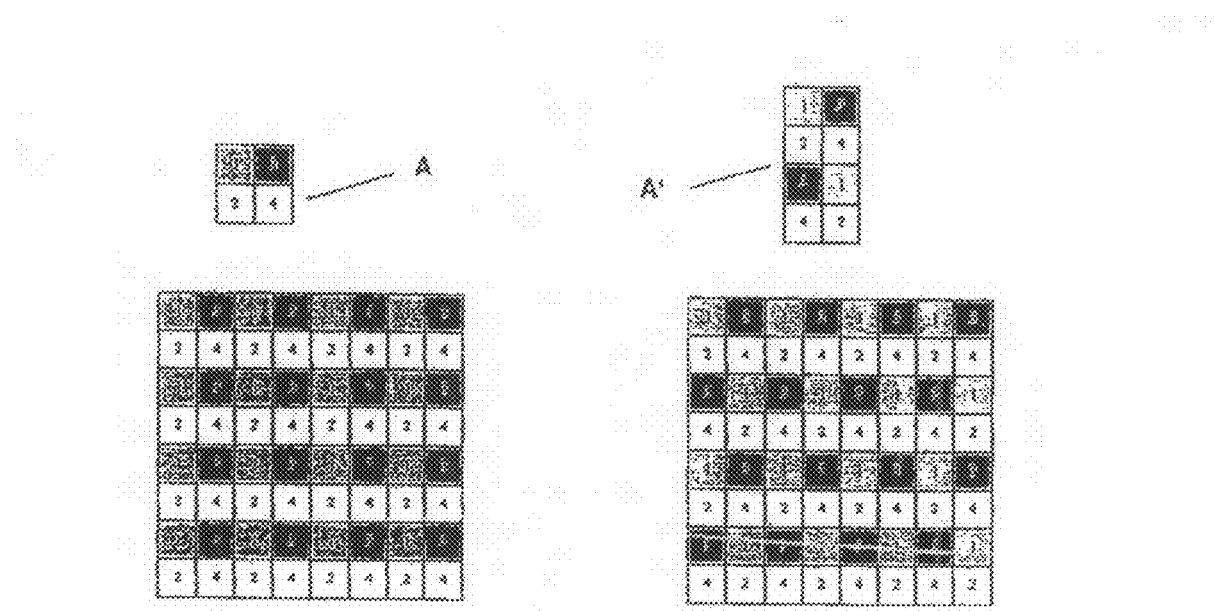
FIG. 1a shows the unit cells and an LED array for 4 colors.

A more homogeneous distribution can be achieved by the larger unit cells. FIG. 1a shows the unit cells A and A' and the filled luminous surfaces for four individual light sources 1, 2, 3 and 4 which preferably emit light of different colors. In a special construction, every two individual light sources 1, 3 and 2, 4 can emit light of the same color.

Figure 1B:
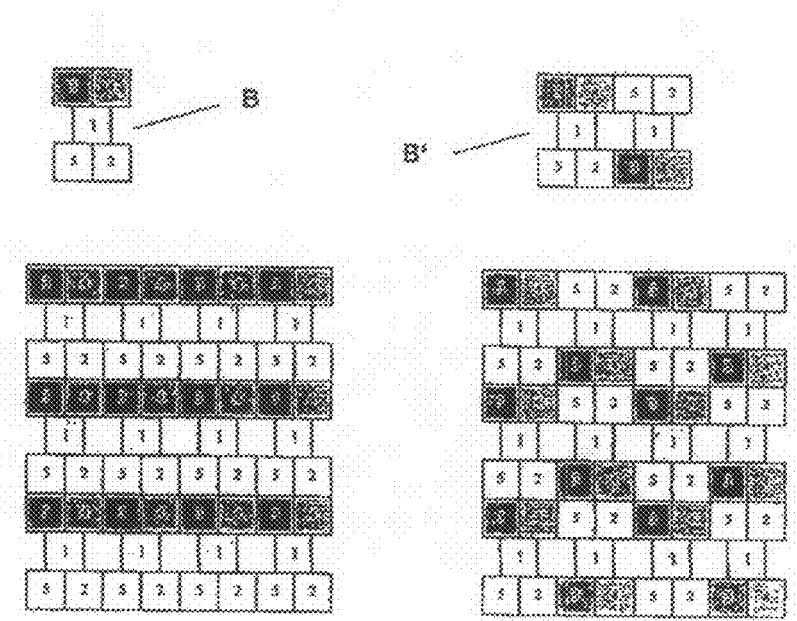
FIG. 1b shows the unit cells and an LED array for 5 colors.
Figure 1C:
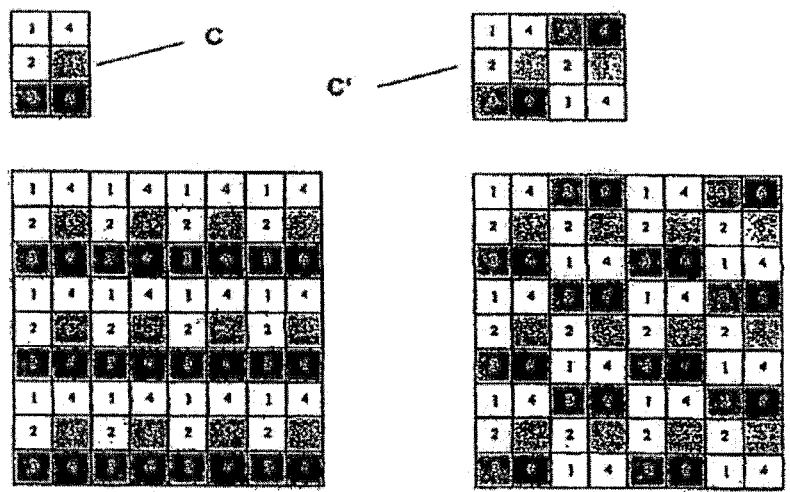
FIG. 1c shows the unit cells and an LED array for 6 colors.

While FIG. 1b shows the unit cells B and B' and the filled luminous surfaces for five individual light sources 1, 2, 3, 4 and 5, FIG. 1c shows the unit cells C and C' and the filled luminous surfaces for six individual light sources 1, 2, 3, 4, 5 and 6.

FIGS. 1a to 1c show how the individual light sources emitting different colors are to be arranged in a unit cell in order to achieve an illumination of the object plane that is as homogeneous as possible with respect to color and intensity.

Figure 2A:
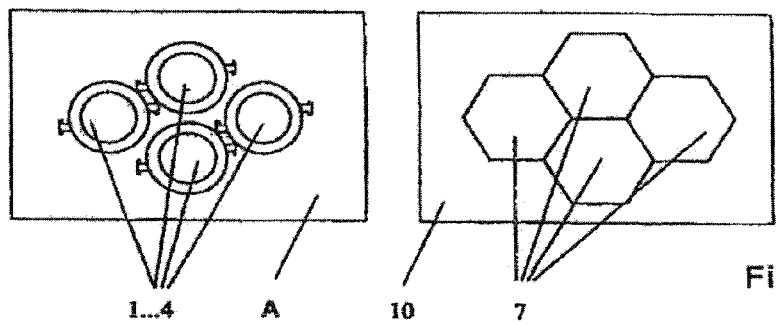
FIG. 2a shows an arrangement of unit cells for 4 sources and the corresponding microlens array.

While FIGS. 1a to 1c show theoretical arrangements for unit cells and filled luminous surfaces, FIG. 2a shows an actual, densest possible arrangement of a unit cell A comprising four individual light sources, imaging optics being arranged in front of every individual light source 1, 2, 3 and 4. Corresponding microlenses 7 which are formed as a microlens array 10 are used as imaging optics and are arranged directly in front of the unit cell A.

Figure 2B:
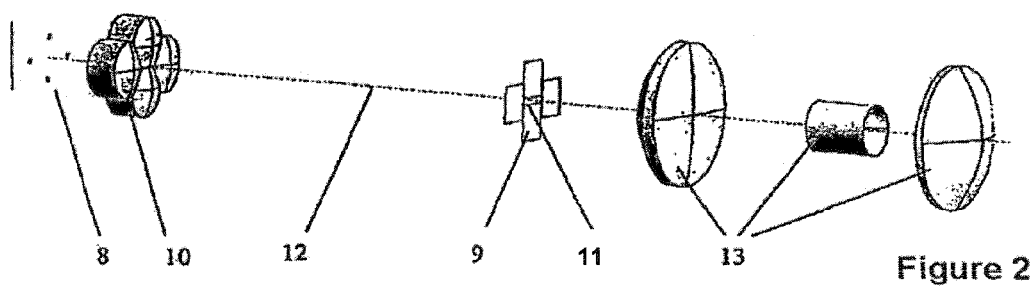
FIG. 2b shows the arrangement with a microlens array according to FIG. 2a in the illumination beam path of a microscope.

FIG. 2b shows the arrangement of the unit cell A with microlens array 10 according to FIG. 2a in the illumination beam path of a microscope and illustrates the operation of a microlens array 10 serving as imaging optics. In particular, the individual light sources are shown in the form of source surfaces 8 which are generated by the latter and whose images 9 are magnified by the microlens array 10. In particular, the images 9 of the source surface 8 generated by the individual light sources are magnified by the microlens array 10 in such a way that the images 9 of the source surfaces 8 of adjacent individual light sources touch one another.

In an advantageous construction, at least one individual light source is decentered with respect to the optical axis 12 of the imaging optics. In this way, it can be ensured that the touching images 9 of the source surfaces 8 form a closed surface. Any gaps 11 that may be present can accordingly be closed.

While microlens arrays which are ideally arranged in or in the vicinity of a conjugate field diaphragm plane serve primarily for homogenization, imaging optics which are arranged directly in front of the individual light sources operate in a completely different manner. A magnified image of the source surface of each individual light source is initially generated by these imaging optics for every individual light source. These source surfaces should ideally touch and therefore should ideally increase the effective filling factor from appreciably below 1 to 1. By filling factor is meant the ratio of luminous surface to carrier surface.

In FIG. 2b, the source surfaces 8 of the microlens array 10 which are generated by the individual light sources are magnified and guided to the illumination beam path of the microscope by suitable imaging optics 13.

Another advantageous construction, not shown, results when one or more individual light sources are decentered in such a way that their images of the source surfaces completely overlap with the images of the source surfaces of adjacent individual light sources. For example, colors can be mixed and even white light can be generated by the superposition of source surfaces and their images.

In particular, one or more lenses, diffractive optics, gradient index lenses or mirrors are used as imaging optics for this purpose. The use of microlens arrays with aspheric lenses that can be fabricated from plastic is especially advantageous.

In particular, small surface-area light sources, by means of which a high filling factor can be achieved, are used as individual light sources in the proposed solution. LEDs, organic light diodes (O-LEDs), fiber-optic lasers, laser diodes or the ends of light-conducting fibers, light-conducting fiber bundles or mixing rods can be used, for example.

It is also conceivable to apply the inventive principle of the effective filling factor to a conventional halogen lamp. The individual windings of the coil of a halogen lamp generate a source surface which, in a first approximation, comprises individual brightly illuminating bars. This source surface which is generated by the coils of the halogen lamp is magnified by imaging optics, i.e., the bars are widened, but not lengthened, so that the bars touch. The effective filling factor can accordingly be increased from appreciably below 1 to 1.

At the same time, the aberrations, particularly of the decentered elements in the front portion of the arrangement, must be controlled and compensated because these elements would otherwise scarcely contribute to a gain in intensity. For this purpose, the respective microlens is suitably decentered relative to the source, which prevents or compensates for these aberrations depending on the source location.

Further, the boundaries of the microlenses should have the least possible azimuthal differences because these would lead in turn to differently received apertures in the different azimuths, which likewise results in field inhomogeneity. In order to achieve this, the individual lenses preferably have hexagonal boundaries and not square boundaries.

Finally, the focal length of the microlens, the limiting diameter or edge length of the bounding hexagon of the microlens, the source distance, and the source surface dimensions must be adapted to on another in such a way that the greatest possible field homogeneity is adjusted. As a result of this, homogenizing elements, e.g., the diffuser, can be dispensed with in the beam path and the arrangement operates extremely efficiently.

Figure 3:
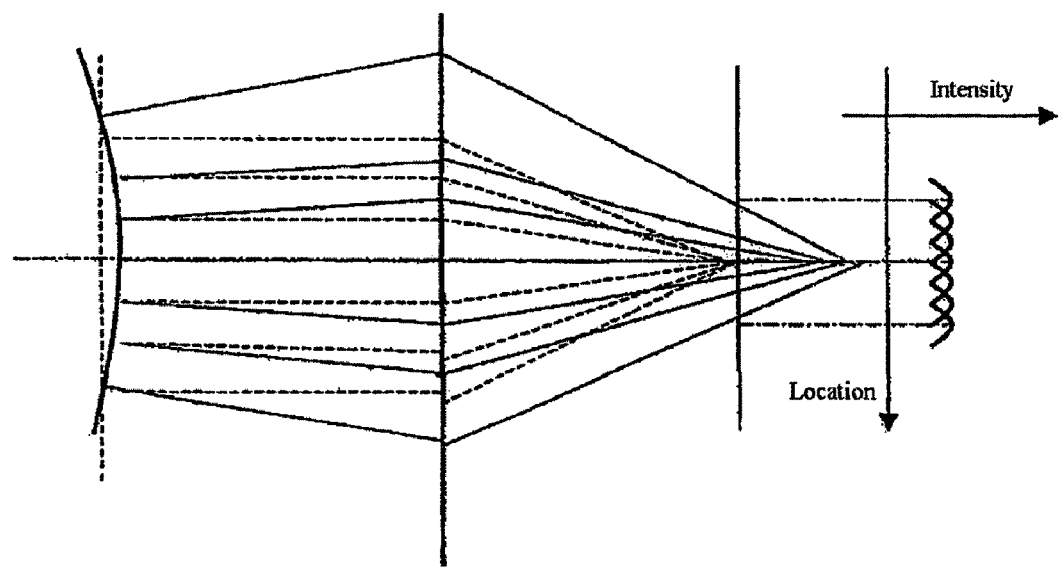
FIG. 3 shows the beam course for a three-dimensional LED array with the corresponding intensity distribution in the object plane.
Figure 4:
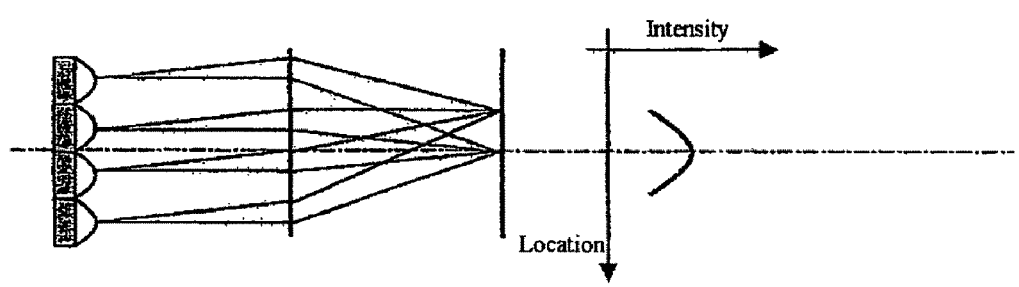
FIG. 4 shows the beam course for a two-dimensional LED array with the corresponding intensity distribution in the object plane.

FIG. 3 shows the beam course for a three-dimensional LED array with the corresponding intensity distribution in the object plane. By way of comparison, FIG. 4 shows the beam course for a two-dimensional LED array with the intensity distribution in the object plane. It can be seen that a slightly inhomogeneous illumination manifesting in an edge drop-off occurs in a two-dimensional LED array in the image plane. This edge drop-off of the intensity in the object field can be prevented by using a three-dimensional LED array because the LEDs are imaged homogeneously over the surface in the field.

The illumination device has additional optical elements for achieving the most homogeneous possible illumination of the object plane. In addition to diffractive optical elements (DOE), microlens arrays are preferably used. The latter are ideally located in or in the vicinity of a conjugate field diaphragm plane and primarily act in a homogenizing manner.

A homogeneous field illumination and a structured illumination in the object plane can be achieved through a suitable combination of illumination beam path, emitting characteristics of the individual LEDs, geometry of the light source and diffuser, microlens array, and control of the individual LEDs.

Illumination variants for all of the essential contrasting methods in microscopy can be generated by the illumination device according to the invention. The LED illumination that is used is electronically switchable, can be regulated with respect to brightness, and supplies all colors. The illumination device is long-lasting and economical, and the beam path is designed so as to be more compact and economical than in conventional microscope illuminations. LEDs have a long life and are very robust and insensitive to vibrations. The spatial light distribution and the color temperature are adjustable. LEDs make possible an extremely efficient conversion of electrical energy into electromagnetic radiation in the desired spectral range with reduced thermal stressing of the device.

While the foregoing description and drawings represent the present invention, it will be obvious to those skilled in the art that various changes may be made therein without departing from the true spirit and scope of the present invention.

What is claimed is:

1. An illumination device for microscopes comprising:
   a plurality of individual light sources which can be regulated with respect to brightness;
   said individual light sources being formed as unit cells and filling a luminous surface by a periodic arrangement;
   wherein separate imaging optics as an array are associated with each individual light source; and
   wherein the imaging optics comprise one or more lenses, diffractive optics, or gradient index lenses;
   wherein all imaging optics are selected and arranged in such a way that the image of the luminous surface of the individual light source is magnified and the images of the luminous surfaces of adjacent individual light sources touch one another without any overlap.

2. The illumination device according to claim 1;
   wherein a unit cell comprises an arrangement of at least four individual light sources with at least two different colors.

3. The illumination device according to claim 1;
   wherein a carrier surface on which the individual light sources are arranged is plane and has a conical section shape or a convex or concave shape.

4. The illumination device according to claim 3;
   wherein the carrier surface is reflecting.

5. The illumination device according to claim 1;
   wherein at least one individual light source is de-centered with respect to an optical axis of the imaging optics.

6. The illumination device according to claim 1;
   wherein one or more individual light sources are decentered in such a way that their images of the luminous surfaces completely overlap with the images of the luminous surfaces of one or more adjacent individual light sources.

7. The illumination device according to claim 1;
   wherein the imaging optics are made of plastic.

8. The illumination device according to claim 1;
   wherein LEDs, organic light diodes (OLEDs), fiber-optic lasers, laser diodes or the end of light-conducting fibers, light-conducting fiber bundles or a mixing rod can be used as individual light sources.

* * * * *